(12) United States Patent
Virelizier et al.

(10) Patent No.: US 8,255,101 B2
(45) Date of Patent: Aug. 28, 2012

(54) METHOD AND DEVICE FOR ESTIMATING AT LEAST ONE WIND CHARACTERISTIC ON AN AIRCRAFT

(75) Inventors: Pierre Virelizier, Toulouse (FR); Thomas Bochot, Castanet Tolosan (FR)

(73) Assignee: Airbus Operations (SAS), Toulouse (FR)

( * ) Notice: Subject to any disclaimer, the term of this patent is extended or adjusted under 35 U.S.C. 154(b) by 283 days.

(21) Appl. No.: 12/719,467

(22) Filed: Mar. 8, 2010

(65) Prior Publication Data
US 2010/0241294 A1    Sep. 23, 2010

(30) Foreign Application Priority Data
Mar. 17, 2009    (FR) .................................... 09 01233

(51) Int. Cl.
G06F 7/70 (2006.01)
G06F 13/00 (2006.01)
G01P 5/00 (2006.01)
(52) U.S. Cl. .................. 701/14; 73/170.11; 702/142
(58) Field of Classification Search .................. None
See application file for complete search history.

(56) References Cited

U.S. PATENT DOCUMENTS

| | | | |
|---|---|---|---|
| 5,091,871 A | 2/1992 | Arethens | |
| 5,422,817 A | 6/1995 | Tazartes et al. | |
| 6,148,179 A * | 11/2000 | Wright et al. | 455/66.1 |
| 6,160,998 A * | 12/2000 | Wright et al. | 455/66.1 |
| 6,163,681 A * | 12/2000 | Wright et al. | 455/66.1 |
| 6,167,238 A * | 12/2000 | Wright | 455/66.1 |
| 6,167,239 A * | 12/2000 | Wright et al. | 455/66.1 |
| 6,173,159 B1* | 1/2001 | Wright et al. | 455/66.1 |
| 6,353,734 B1* | 3/2002 | Wright et al. | 455/98 |
| 6,828,922 B1* | 12/2004 | Gremmert et al. | 340/949 |
| 7,196,621 B2* | 3/2007 | Kochis | 340/539.13 |
| RE40,479 E * | 9/2008 | Wright et al. | 455/98 |
| 7,493,197 B2* | 2/2009 | Bitar et al. | 701/14 |
| 7,633,411 B2* | 12/2009 | Bitar et al. | 340/970 |
| 7,761,197 B2* | 7/2010 | Puig | 701/14 |
| 7,770,445 B2* | 8/2010 | Lassouaoui et al. | 73/170.11 |
| 8,046,119 B2* | 10/2011 | Bitar et al. | 701/14 |
| 2007/0236367 A1 | 10/2007 | Matayoshi et al. | |
| 2008/0021601 A1* | 1/2008 | Puig | 701/14 |
| 2008/0046171 A1* | 2/2008 | Bitar et al. | 701/208 |
| 2008/0168835 A1* | 7/2008 | Lassouaoui et al. | 73/170.11 |
| 2010/0026007 A1* | 2/2010 | Bevirt | 290/55 |
| 2011/0299062 A1* | 12/2011 | Jenaro Rabadan et al. | 356/28.5 |

* cited by examiner

Primary Examiner — Mussa A Shaawat
(74) Attorney, Agent, or Firm — Novak Druce + Quigg LLP (57) ABSTRACT

A method and a device for estimating on an aircraft at least one wind characteristic.

The device (1) comprises means (7) for determining a corrective term being representative of an apparent wind created upon a rotation of the aircraft and means (4) for determining the wind characteristic taking into account such a corrective term.

11 Claims, 3 Drawing Sheets

ND DEVICE FOR ESTIMATING
METHOD AND DEVICE FOR ESTIMATING AT LEAST ONE WIND CHARACTERISTIC ON AN AIRCRAFT

CROSS-REFERENCE TO RELATED APPLICATIONS

This application claims priority to French Patent Application 0901233, filed Mar. 17, 2009, the entire contents of which are incorporated herein by reference.

FIELD OF THE INVENTION

The present invention relates to a method and a device for estimating on an aircraft at least one wind characteristic existing outside said aircraft.

BACKGROUND OF THE INVENTION

It is known that it is desirable, in particular in the approaching and landing phases, to be able to estimate, aboard an aircraft, in particular a transport aircraft, the force and the direction of the wind, i.e., the speed and the moving direction, with respect to the ground, of the air mass in which the aircraft moves.

Such speed and wind direction information could be more particularly used:

for managing the aircraft navigation (flight plan); and
for assisting steering, in particular upon approaching a landing runway and the subsequent landing.

Such a wind estimation is generally achieved through the aircraft speed with respect to the ground, being, for example, determined by means of on-board inertia units, and the aircraft speed in the air, being, for example, measured by means of pressure probes, also on board.

However, such a usual estimating method often leads to erroneous results, more particularly due to a possible mismatch between the results as obtained from two redundant ways generally provided on aircrafts. It is known, from FR-2 906 615, a wind estimating device which allows to perform, aboard an aircraft, an accurate estimation of the wind. To this end, such a usual device uses, in addition to the above mentioned speed information, a piece of information relating to the attack of the aircraft in the air, for calculating the horizontal component of the wind (force and direction). Taking into account the attack, i.e., the moving slope of the aircraft in the air, in addition to such a move speed, allows for a more accurate estimation of the wind to be reached. Such an estimation of the wind could be further refined through taking into account an additional piece of information being representative of the measured slide slip.

In such usual estimations, the speed of the wind is calculated from the difference between the ground speed of the aircraft and the speed of the aircraft in the air. Such a calculation is exact, when the measurements of the ground and air speeds are expressed in one single point of the aircraft. Now, this is not generally the case. In fact:

the ground speed of the aircraft is generally expressed (i.e. defined) at the centre (gravity centre or reference centre) of the aircraft; whereas the air speed and the slide slip and attack angles are obtained from measurements achieved by common probes being generally located at the level of the front tip of the aircraft, where the air flow is the least turbulent.

Consequently, due to the use of data as obtained from the measurements achieved at two different points of the aircraft, the usual estimations of the wind show some inaccuracy, as soon as the aircraft performs rotation operations. The usual estimations are thus only accurate when the aircraft is flying along a straight line. Such an important drawback restricts the cases of use for the wind speed estimated by the common devices.

Additionally, in the usual solutions, estimating in general occurs only in two dimensions in the horizontal plane, i.e. in the plane being normal to the surface of the earth. This also contributes to limit the cases of use for the estimated wind speed.

SUMMARY OF THE INVENTION

The present invention aims at overcoming such drawbacks. It relates to a method for performing, on an aircraft, a particularly accurate estimation of at least one characteristic (speed, direction) of the wind existing inside said aircraft, and this, whatever the operation (straight line flight or rotational flight) performed by the aircraft at the time when measurements adapted for such an estimation are being performed.

To this end, according to the invention, said method wherein, upon a flight of said aircraft, the following automated operations are performed:

a) a first piece of speed information is received relating to the speed of the aircraft in a terrestrial reference system, being expressed in a first point (in particular, the gravity centre) of the aircraft;

b) a second piece of speed information is received relating to the speed of the aircraft in the air, being expressed in a second point (located, for instance, at the level of the nose) of the aircraft; and c) said wind characteristic is determined in said terrestrial reference system, from said first and second pieces of speed information, is noteworthy in that, in addition, a corrective term is determined being representative of an apparent wind created upon a rotation of the aircraft and in that in step a), said wind characteristic is determined taking into account said corrective term.

Thus, according to this invention, said corrective term is integrated into the calculation of the wind characteristics, enabling to eliminate the apparent wind being introduced into the calculations when anemometric operations are performed upon a rotational motion of the aircraft and the speed information being used in such calculations is expressed in two different points of the aircraft. Such an apparent wind introduced in the usual estimations, an error in the calculation of said wind characteristic, such error being thus corrected by means of this invention.

Consequently, the method according to the invention provides a particularly accurate and reliable estimation of at least one wind characteristic, more particularly, the speed and/or direction thereof, and this whatever the type of flight operation (straight line flight or rotational flight) performed by the aircraft upon measurements provided for the calculation.

In a preferred embodiment, said corrective term TC is calculated using the following expression:

$$TC = \vec{\Omega} \wedge \vec{GA}$$

wherein:
  $\wedge$ represents the vector product;
  $\vec{\Omega}$ represents the rotation rate of the aircraft in an inertial reference system;
  G represents a reference point of the aircraft, corresponding to said first point; and A represents the position on the aircraft of at least one anemometric probe, having its measurements used for determining said second piece of speed information, such a position A corresponding to said second point.

In such preferred embodiment, advantageously, there is calculated in step c), as the wind characteristic, a speed vector $\vec{Vv}$ of said wind, using the following expression:

$$\vec{Vv} = \vec{Vgs} - \vec{Vair} + \vec{\Omega} \cdot \vec{GA}$$

wherein, in addition to the above mentioned parameters:

$\vec{Vgs}$ represents said first piece of speed information relating to the speed of the aircraft in a terrestrial reference system; and $\vec{Vair}$ represents said second piece of speed information relating to the speed of the aircraft in the air.

Thus, through this invention, the wind is calculated under the form of a vector $\vec{Vv}$, i.e. in three dimensions. Thereby, there is available, as opposed to the usual estimations, in addition to the wind speed in the horizontal plane, also the vertical component of said wind speed. This enables to increase the cases of use for such wind estimation.

The present invention also relates to a method for automatically implementing aboard an aircraft at least one wind characteristic existing outside said aircraft.

This method is noteworthy in that, upon a flight of said aircraft, the following automated operations are automatically performed:

a) a first piece of speed information is determined on the aircraft relating to said speed of the aircraft in a terrestrial reference system;

b) a second piece of speed information is determined on the aircraft relating to the speed of the aircraft in the air; and c) said wind characteristic is determined by means of said first and second speed information, implementing the above mentioned method.

In addition, the present invention relates to a device for automatically estimating aboard an aircraft at least one wind characteristic existing outside said aircraft, said method being aboard the aircraft and comprising:

first means for receiving a first piece of speed information relating to the speed of the aircraft in a terrestrial reference system, being expressed in a first point of the aircraft;

second means for receiving a second piece of speed information relating to the speed of the aircraft in the air, being expressed in a second point of the aircraft; and third means for determining, at least from said first and second speed information, said wind characteristic in the terrestrial reference system.

According to this invention, said device is noteworthy in that:

it further comprises auxiliary means for determining a corrective term being representative of an apparent wind created upon a rotation of the aircraft; and said third means are formed so as to determine said wind characteristic taking into account said corrective term determined by said auxiliary means.

The device according to this invention thus enable to achieve an accurate and reliable estimation of at least one characteristic (wind, direction) of the wind existing outside the aircraft, and this, whatever the operation (straight line flight or rotational flight) being performed by the aircraft when measurements are performed for such an estimation.

In addition, the present invention further relates to:

a system comprising, in addition to a device, such as the above mentioned one:
  means for generating said first piece of speed information;
  means for generating said second piece of speed information; and/or an aircraft, more particularly, a transport aircraft, comprising a device and/or a system such as the above mentioned ones.

BRIEF DESCRIPTION OF THE DRAWINGS

The figures of the appended drawing will make it obvious how to implement this invention. On these figures, identical numerical references indicate identical elements.

DETAILED DESCRIPTION

Figure 1:
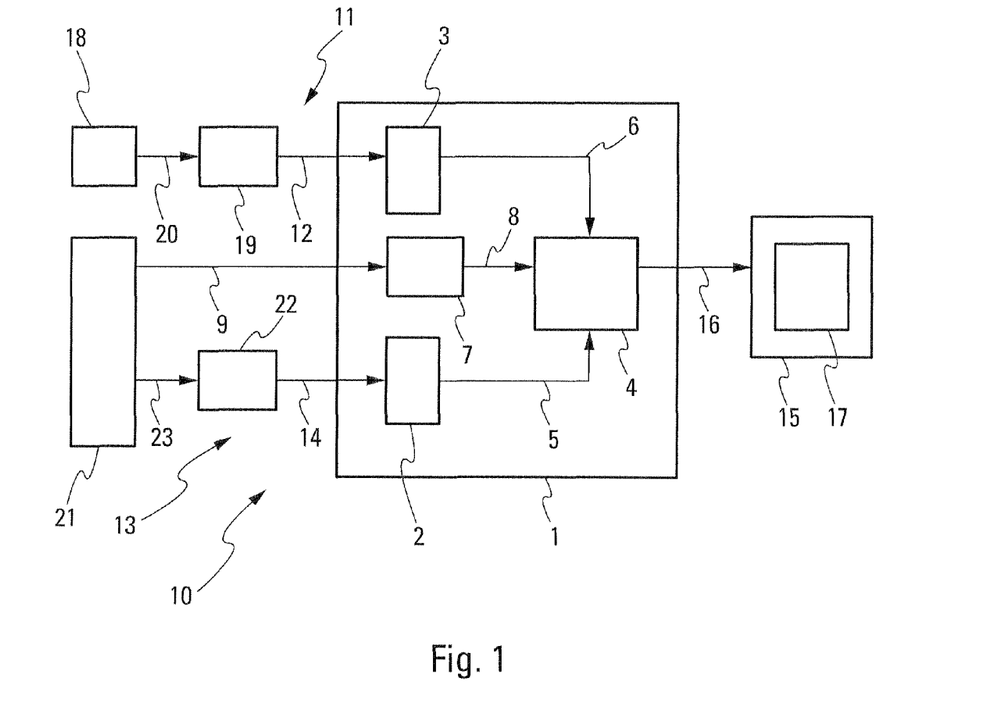
FIG. 1 is the block diagram of a system according to the invention for automatically estimating from an aircraft a wind characteristic.

The device 1 according to the invention and schematically represented on FIG. 1 is adapted for estimating aboard an aircraft AC, more particularly, a transport aircraft, at least one characteristic or component (as hereinafter set forth) of the wind being generated outside said aircraft AC, i.e. that such a device 1 is intended for estimating at least one component of a motion of an air mass relative to a terrestrial reference system, from the aircraft AC moving in such an air mass.

To this end, said device 1 being aboard the aircraft AC, comprises:

means 2 for receiving a first piece of speed information relating to the speed of the aircraft AC in a terrestrial reference system. Such a speed is expressed in a first point G of the aircraft AC;

means 3 for receiving a second piece of speed information relating to the speed of the aircraft AC in the air. Such a speed is expressed in a second point A of the aircraft AC; and means 4 being linked via links 5 and 6 to said means 2 and 3 and being formed so as to determine, at least from said first and second speed information as received from said means 2 and 3, said wind characteristic in said terrestrial reference system.

According to the invention, in particular in order to obtain a particularly accurate and reliable estimation of said wind characteristic, and this whatever the motions or the operations of the aircraft AC:

the device 1 further comprises auxiliary means 7 for determining a corrective term TC, as hereinafter set forth, being representative of an apparent wind created upon a rotation of the aircraft AC; and said means 4 are linked via a link 8 to said means 7 and are formed so as to determine said wind characteristic taking into account the corrective term TC as determined by said means 7.

The device 1 according to the invention is part of a system 10 for automatically generating aboard an aircraft AC at least one wind characteristic existing outside said aircraft AC. Such a system 10 comprises, in addition to said device 1, more particularly:

means 11 being linked via a link 12 to said device 1 and being formed so as to generate said second piece of speed information, as mentioned hereinafter; and means 13 being linked via a link 14 to said device 1 and being formed so as to generate said first piece of speed information, as set forth hereinafter.

Said system 10 further comprises means 15 being linked via a link 16 to said device 1 and being formed so as to show to a crew member of the aircraft AC, more specifically to the pilot, the wind characteristic(s) having been estimated by said device. To this end, said means 15 could more specifically show such data on a viewing screen 17 in the cockpit of the aircraft AC.

Thus, through the invention, said corrective term TC is integrated into the wind characteristic, enabling to eliminate the apparent wind being introduced into the calculations when the anemometric measurements are achieved upon the rotation of the aircraft AC and the speed information being used in the calculations are expressed in two different points A and G of the aircraft AC. Within the scope of the present invention, a piece of speed information being expressed in a point A, G means that it has either been calculated with respect to this point, or that measurements to be used for calculating it were achieved at the point.

Such an apparent wind introduced, in the common estimations, an error in the calculation of said wind characteristic, such an error being thus corrected according to the invention. Consequently, the device 1 (or system 10) according to this invention provides a particularly accurate and reliable estimation of at least one wind characteristic, more particularly the speed and/or direction thereof, and this, whatever the type of flight operation (straight line flight or rotational flight) being performed by the aircraft AC when the measurements intended for the calculation are being achieved.

Figure 2:
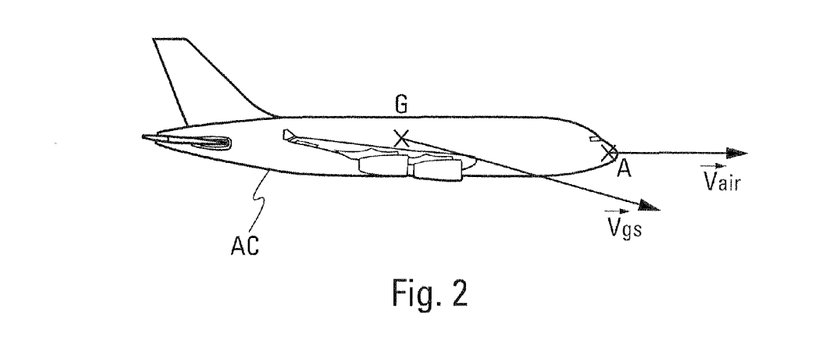
FIG. 2 is a schematic view of an aircraft, to which the present invention is applied.

In a preferred embodiment, said means 7 calculate said corrective term TC using the following expression:

$$TC = \vec{\Omega} \wedge \vec{GA}$$

wherein:

$\wedge$ represents the vector product;

$\vec{\Omega}$ represents the rotation rate of the aircraft AC in an inertial reference system;

G represents a reference point of the aircraft AC, in particular the gravity center thereof, corresponding to said first mentioned point; and A represents the position on the aircraft AC of at least one anemometric probe, having its measurements being used for determining said second piece of speed information. Such a position A represented on FIG. 2 corresponds to said second mentioned point.

In this preferred embodiment, said means 4 calculate, as a wind characteristic, a speed vector $\vec{Vv}$ of said wind, using the following expression:

$$\vec{Vv} = \vec{Vgs} - \vec{Vair} + \vec{\Omega} \wedge \vec{GA}$$

wherein:

$\vec{Vgs}$ represents said first piece of speed information; and $\vec{Vair}$ represents said second piece of speed information.

Estimating the speed of the wind is thus based on three terms, namely:

the speed $\vec{Vgs}$ of the aircraft AC with respect to the earth surface;

the speed $\vec{Vair}$ of the aircraft AC in the air; and said corrective term TC representing a wind created upon rotation of the aircraft AC. Taking into account such a corrective term TC enables to eliminate the apparent wind created on the anemometric probes upon the rotation of the aircraft AC.

In a particular embodiment, said means 11 comprise a set 18 of usual anemometric sensors, being able to deliver information relating to the motion of the aircraft AC in the air mass it is crossing at a given time. Such anemometric sensors comprise, for example, a static pressure probe and a total pressure probe, from which the air speed TAS (True Air Speed), an angle of attack probe and a slide slip angle probe. It is to be reminded that the air speed is the standard (or module) of the moving (or speed) vector of the aircraft AC in the air mass. Information delivered by such anemometric sensors could be processed within an anemometric unit 19 being linked via a link 20 to said set 18, being sometimes referred to as ADR (Air Data Reference) and usually generating, more specifically, an piece of air speed information TAS (corresponding to the standard of the vector TAS expressing the speed of the aircraft AC in the air mass), an angle of attack $\alpha$ and a slide slip angle $\beta$.

Moreover, in a particular embodiment, said means 13 could include means 21 comprising:

a set of inertia sensors allowing to determine the motion of the aircraft AC with respect to the terrestrial reference system. Such sensors comprise, for instance, three gyrometers and three accelerometers; and a satellite positioning system [for example of the GPS type (Global Positioning System)] able to deliver information about the geographical location of the aircraft AC, based on data received from orbiting satellites around the earth globe.

A processing unit 22 for the terrestrial reference (or inertia unit) receives (via a link 23) and processes the information as supplied by means 21 (more specifically, information issued, on the one hand, from the set of inertia sensors and on the second hand, from the satellite positioning system) and usually delivers, more specifically the ground speed being the standard of the projection in the horizontal plane at the place under consideration, of the speed vector $\vec{Vgs}$ of the aircraft AC with respect to the terrestrial reference system, as well as the geographic course $\psi$, the pitching angle $\theta$ and the rolling angle $\phi$ of the aircraft AC. Alternatively, the invention could also be used in a system only comprising inertia sensors (or alternatively, only the satellite positioning system) as a source of positioning data. Means 21 (or the unit 22) further deliver some information to the means 7 via a link 9.

It could be noticed that the anemometric unit 19 and the processing unit 22 for the terrestrial reference could be gathered within a single electronic housing, for instance, of the ADIRU (Air Data and Inertial Reference Unit) type based on the ARINC 738 standard.

Additionally, although a single item of each element is represented on FIG. 1, it is possible to multiply by two or three each of such elements in order to obtain a redundant architecture.

It is to be noticed that the direction of the wind is equal to the angle $\psi t$ between the axis directed to the North of the Earth and the speed vector $\vec{Vv}$ of the wind determined by the device 1. Such a wind direction is obtained using the following expression:

$$\psi t = \text{arc } tg(VvEO/VvNS)$$

wherein:

VvEO is the component of the wind speed in the East-West direction and VvNS is the component of the wind speed in the North-South direction.

The speed vector of the wind $\vec{Vv}$ in a terrestrial reference point could be written as follows:

$$\vec{Vv} = \begin{pmatrix} VvNS \\ VvEO \\ VvZO \end{pmatrix} \begin{matrix} \vec{X}0 \\ \vec{Y}0 \\ \vec{Z}0 \end{matrix}$$

Hereinafter, the equations to be used in the usual reference points will be set forth, using the common definitions of the angle used on the aircraft AC, namely an aircraft reference point RA and a terrestrial reference point RT.

The principle being described for a vector equation, it is applicable whatever the projection reference system and the definition of the angles of the aircraft AC being used.

Figure 3:
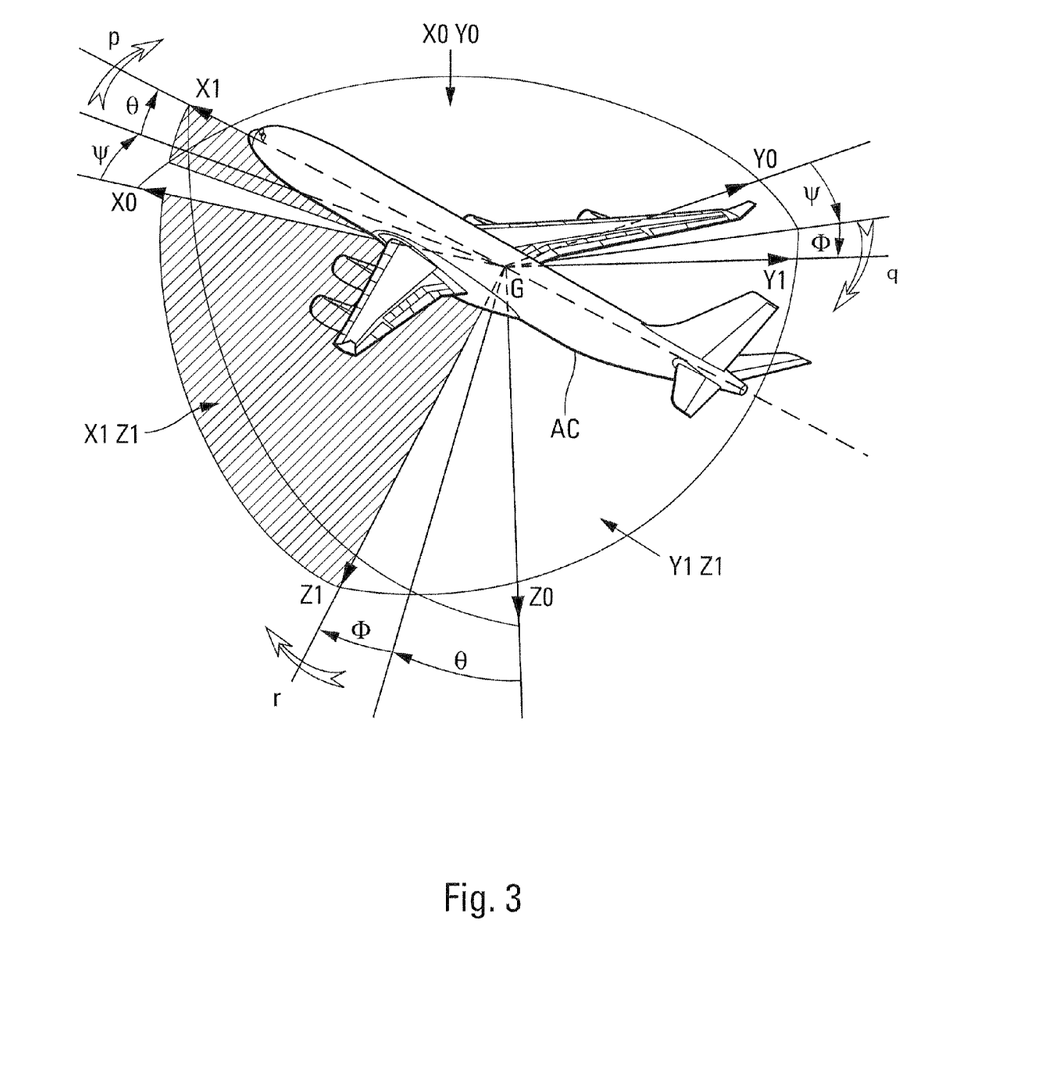
FIGS. 3 and 4 are two diagrams illustrating the reference points to be used in the calculations as implemented within the scope of the present invention.
Figure 4:
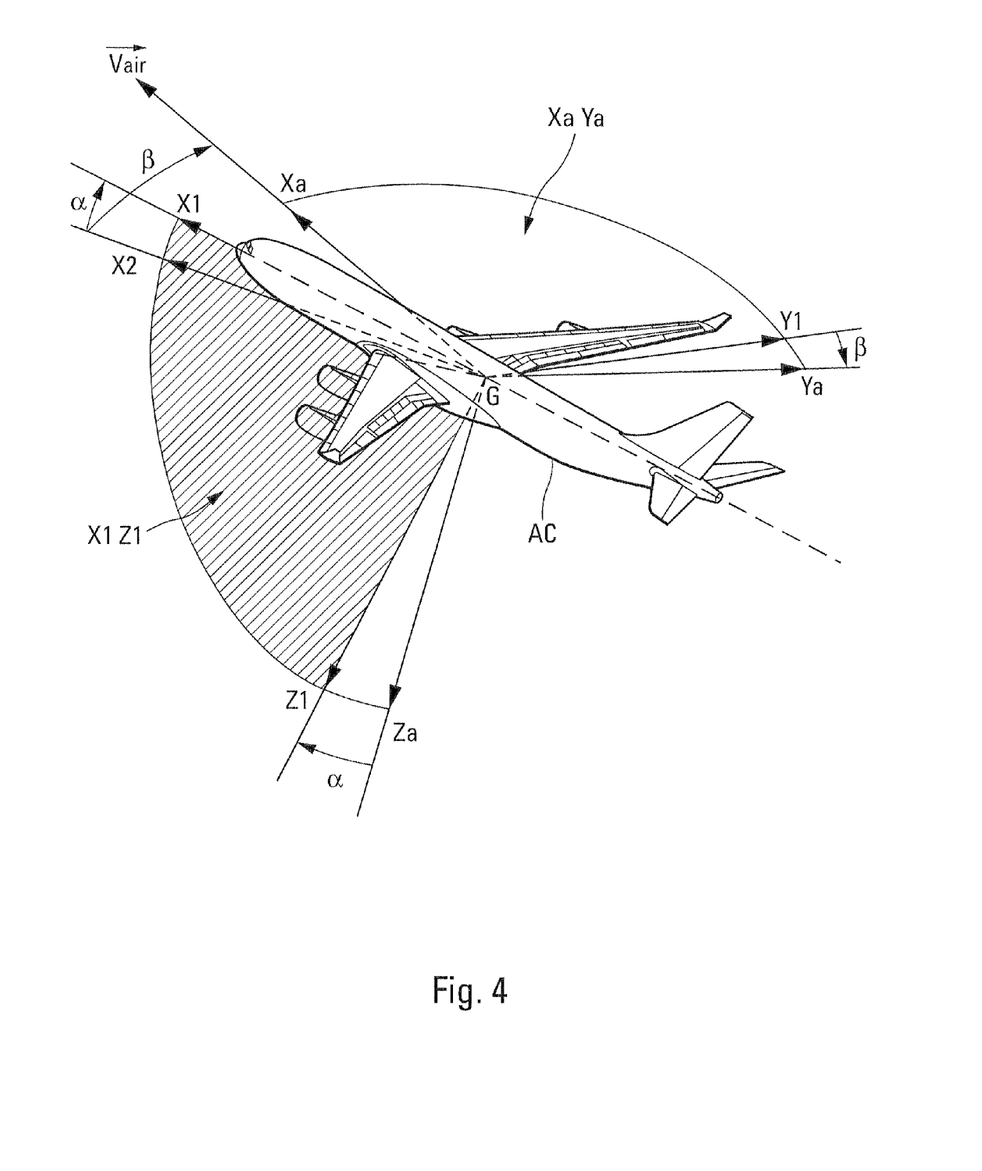

More precisely, there are used, as represented on FIGS. 3 and 4:
- an aircraft reference system Ref1 moving with the aircraft AC, i.e. that each point of the aircraft AC is stationary in such a reference system Ref1. Such a reference system Ref1 could be defined by:
  - the reference point G; and
  - an aircraft reference point RA of axes X1, Y1, Z1, wherein:
    - X1 represents the longitudinal axis of the aircraft AC, being defined as positive from the tail to the nose of the aircraft AC;
    - Y1 represents the axis perpendicular to the symmetry plane of the aircraft AC, being defined as positive towards the right wing; and
    - Z1 is the axis completing the trihedron (comprised within the symmetry plane of the aircraft AC);
- a terrestrial reference system Ref0 moving with the Earth, that is that each point of the Earth is stationary within such a reference system Ref0, more particularly, the surface and the centre thereof. Such a terrestrial reference system Ref0 could be defined using a terrestrial reference point RT of axes X0, Y0, Z0, wherein:
  - X0 is a horizontal direction and positive towards the North of the Earth;
  - Y0 is a horizontal direction and positive to the West; and
  - Z0 completes the trihedron (and points towards the centre of the Earth); and
- an inertial or Galilean reference system Refa, representing the measurement reference of the inertia sensors (gyroscopes and accelerometers) of the aircraft AC. It could be defined by:
  - the centre of the Earth; and
  - three inertial directions (pointing, for example, towards particular stars).

An aerodynamic reference point Ra could also be considered of axes Xa, Ya and Za, wherein:
- Xa represents the axis and the orientation of the air speed;
- Ya is defined in the same plane as Xa and Y1; and
- Za completes the trihedron (and is included within the symmetry plane of the aircraft AC).

It further takes into consideration the following parameters of the aircraft AC:
- the angle of attack $\alpha$;
- the slide slip angle $\beta$;
- the pitching $\theta$;
- the rolling $\phi$;
- the course $\psi$; and
- the angular speeds p, q and respectively of rolling, pitching and yawing.

The position of the aircraft A is localized in the terrestrial reference point RT by all three angles $\theta$, $\phi$ and $\psi$, as represented on FIG. 3 (showing the aircraft reference point RA in the terrestrial reference point RT), and the direction of the air speed $\vec{Vair}$ is localized in the aircraft reference RA by both angles $\alpha$ and $\beta$, as represented on FIG. 4 (showing the air speed in the aircraft reference point RA).

The following coordinates are obtained of the different vectors in the above mentioned reference points:
- the speed of the wind in the terrestrial reference system. Such a vector is expressed in the aircraft reference point RA:

$$\vec{Vv} = \begin{pmatrix} VvX1 \\ VvY1 \\ VvZ1 \end{pmatrix} \begin{matrix} \vec{X}1 \\ \vec{Y}1 \\ \vec{Z}1 \end{matrix}$$

and in the terrestrial reference point RT:

$$\vec{Vv} = \begin{pmatrix} VvNS \\ VvEO \\ VvZO \end{pmatrix} \begin{matrix} \vec{X}0 \\ \vec{Y}0 \\ \vec{Z}0 \end{matrix}$$

- the speed of the aircraft AC in the terrestrial reference system. Such a vector is expressed in the terrestrial reference point RT:

$$\vec{Vgs} = \begin{pmatrix} VNS \\ VEO \\ VZ0 \end{pmatrix} \begin{matrix} \vec{X}0 \\ \vec{Y}0 \\ \vec{Z}0 \end{matrix}$$

- the air speed in the aircraft reference system. Such a vector is expressed in the aerodynamic reference point Ra:

$$\vec{Vair} = \begin{pmatrix} TAS \\ 0 \\ 0 \end{pmatrix} \begin{matrix} \vec{X}a \\ \vec{Y}a \\ \vec{Z}a \end{matrix}$$

- the rotation rate of the aircraft AC in the inertial reference system (measurement of gyroscopes of the aircraft A). Such a vector is expressed in the aircraft reference point RA:

$$\vec{\Omega} = \begin{pmatrix} p \\ q \\ r \end{pmatrix} \begin{matrix} \vec{X}1 \\ \vec{Y}1 \\ \vec{Z}1 \end{matrix}$$

the position A of an anemometric probe or sensor (used for measurements) with respect to the reference centre G of the aircraft AC in the aircraft reference point RA:

$$\vec{GA} = \begin{pmatrix} LX1 \\ LY1 \\ LZ1 \end{pmatrix} \begin{matrix} \vec{X}1 \\ \vec{Y}1 \\ \vec{Z}1 \end{matrix}$$

The result of the vector product in the aircraft reference point RA is noted as follows:

$$\vec{\Omega} \wedge \vec{GA} = \begin{pmatrix} q \cdot LZ1 - r \cdot LY1 \\ r \cdot LX1 - p \cdot LZ1 \\ p \cdot LY1 - q \cdot LX1 \end{pmatrix}$$

$$= \begin{pmatrix} VLX1 \\ VLY1 \\ VLZ1 \end{pmatrix} \begin{matrix} \vec{X}1 \\ \vec{Y}1 \\ \vec{Z}1 \end{matrix}$$

In the aircraft reference point RA:
the speed of the wind along the longitudinal axis X1 is:

$VvX1 = VNS \cdot \cos\psi \cdot \cos\theta$ $+ VEO \cdot \sin\psi \cdot \cos\theta$ $- VZ0 \cdot \sin\theta$ $- TAS \cdot \cos\alpha \cdot \cos\beta$ $+ VLX1$ the speed of the wind along the lateral axis Y1 is:

$VvY1 = VNS \cdot (\cos\psi \cdot \sin\theta \cdot \sin\phi - \sin\psi \cdot \cos\phi)$ $+ VEO \cdot (\sin\psi \cdot \sin\theta \cdot \sin\phi + \cos\psi \cdot \cos\phi)$ $+ VZ0 \cdot \cos\theta \cdot \sin\phi$ $- TAS \cdot \sin\beta$ $+ VLY1$ the speed of the wind along the axis Z1 is:

$VvZ1 = VNS \cdot (\cos\psi \cdot \sin\theta \cdot \cos\phi + \sin\psi \cdot \sin\phi)$ $+ VEO \cdot (\sin\psi \cdot \sin\theta \cdot \cos\phi - \cos\psi \cdot \sin\phi)$ $+ VZ0 \cdot \cos\theta \cdot \cos\phi$ $- TAS \cdot \sin\alpha \cdot \cos\beta$ $+ VLZ1$ In the terrestrial reference point RT:
the speed of the wind along the North-South axis X0 is:

$VvNS = VNS$ $- TAS \cdot [\cos\beta \cdot \cos\alpha \cdot \cos\psi \cdot \cos\theta]$ $- TAS \cdot [\sin\beta \cdot (\cos\psi \cdot \sin\theta \cdot \sin\phi - \sin\psi \cdot \cos\phi)]$ $- TAS \cdot [\cos\beta \cdot \sin\alpha \cdot (\cos\psi \cdot \sin\theta \cdot \cos\phi + \sin\psi \cdot \sin\phi)]$ $+ VLX1 \cdot \cos\psi \cdot \cos\theta$ $+ VLY1 \cdot (\cos\psi \cdot \sin\theta \cdot \sin\phi - \sin\psi \cdot \cos\phi)$ $+ VLZ1 \cdot (\cos\psi \cdot \sin\theta \cdot \cos\phi + \sin\psi \cdot \sin\phi)$ the speed of the wind along the East-West axis Y0 is:

$VvEO = VEO$ $- TAS \cdot [\cos\beta \cdot \cos\alpha \cdot \sin\psi \cdot \cos\theta]$ $- TAS \cdot [\sin\beta \cdot (\sin\psi \cdot \sin\theta \cdot \sin\phi + \cos\psi \cdot \cos\phi)]$ $- TAS \cdot [\cos\beta \cdot \sin\alpha \cdot (\sin\psi \cdot \sin\theta \cdot \cos\theta - \cos\psi \cdot \sin\phi)]$ $+ VLX1 \cdot \sin\psi \cdot \cos\theta$ $+ VLY1 \cdot (\sin\psi \cdot \sin\theta \cdot \sin\phi + \cos\psi \cdot \cos\phi)$ $+ VLZ1 \cdot (\sin\psi \cdot \sin\theta \cdot \cos\phi - \cos\psi \cdot \sin\phi)$ the speed of the wind along the vertical axis Z0 is:

$VvZ0 = VZ0$ $- TAS \cdot [\cos\beta \cdot \cos\alpha \cdot \sin\theta + \sin\beta \cdot \cos\theta \cdot \sin\phi + \cos\beta \cdot \sin\alpha \cdot \cos\theta \cdot \cos\phi]$ $- VLX1 \cdot \sin\theta$ $+ VLY1 \cdot \cos\theta \cdot \sin\phi$ $+ VLZ1 \cdot \cos\theta \cdot \cos\phi$ Herein below, the calculation principle to be used is justified.

It is known that the value of the wind speed in the terrestrial reference system Ref0 is defined by:

$$\vec{V}v = \left(\frac{d\vec{CA}}{dt}\right)_{Ref0}$$

with:
C, the centre of the Earth (stationary point of reference in the inertial reference system Refa and the terrestrial reference system Ref0); and
A, the place where the anemometric probes or sensors are located measuring the air mass.

The vector is split in two parts so as to have the speed of the aircraft AC appear in the terrestrial reference system Ref0: or:

$$\vec{V}v = \left(\frac{d\vec{CA}}{dt}\right)_{Ref0}$$

$$= \left(\frac{d\vec{CG}}{dt}\right)_{Ref0} + \left(\frac{d\vec{GA}}{dt}\right)_{Ref0}$$

$$\vec{V}v = \vec{V}gs + \left(\frac{d\vec{GA}}{dt}\right)_{Ref0}$$

But the air speed is measured in the aircraft reference system Ref1. The usual formula of drift reference system change is applied:

$$\left(\frac{d\overrightarrow{GA}}{dt}\right)_{Ref0} = \left(\frac{d\overrightarrow{GA}}{dt}\right)_{Ref1} + \overrightarrow{\Omega 1} \wedge \overrightarrow{GA}$$

with:
G, the reference point of the aircraft AC;
A, the position of the anemometric probes;

$$\overrightarrow{Vair} = -\left(\frac{d\overrightarrow{GA}}{dt}\right),$$

the air speed in the aircraft reference system Ref1; and
$\overrightarrow{\Omega 1}$ the rotation rate of the aircraft reference system Ref1 in the terrestrial reference system Ref0.

At such a time, it is approximated that the terrestrial reference system Ref0 is Galilean. This allows for the measurement of the gyroscopes to be directly used for calculating the vector illustrating the rotation rate. Such an approximation ($\overrightarrow{\Omega 1} = \overrightarrow{\Omega}$) is possible for the present application, as the rotation of the Earth is very slow and the lever arm is reduced, so that the inaccuracy being introduced is minor (lower than a $\frac{1}{100}^{th}$ of knot).

Thus, finally, the following expression is obtained (being used by the means 4 of the device 1):

$$\overrightarrow{Vv} = \overrightarrow{Vgs} - \overrightarrow{Vair} + \overrightarrow{\Omega} \char`\^ \overrightarrow{GA}$$

The present invention thus takes into account the following parameters:
the motion speed of the aircraft AC in the terrestrial reference point RT;
the speed of the aircraft AC in the air;
the direction of the speed of the aircraft AC in the air (angle of attack and slide slip angle); and
the inertia angular speed.

However, implementing the present invention neither depends on the sensors to be used, nor on the calculation methods to be used for determining such different parameters.

The invention claimed is:
1. A method for automatically estimating aboard an aircraft (AC) at least one wind characteristic existing outside said aircraft (AC), such a method wherein, upon said aircraft (AC) flying, the following automated operations are performed via a processor:
a) a first piece of speed information is received relating to the speed of the aircraft (AC) in a terrestrial reference system, being expressed in a first point (G) of the aircraft (AC);
b) a second piece of speed information ($\overrightarrow{Vair}$) is received relating to the speed of the aircraft (AC) in the air, being expressed in a second point (A) of the aircraft; and
c) from at least said first and second speed information, said wind characteristic is determined in said terrestrial reference system, such a wind characteristic being determined taking into account a corrective term being representative of an apparent wind,
wherein said corrective term TC is calculated using the following expression:

$$TC = \overrightarrow{\Omega} \char`\^ \overrightarrow{GA}$$

wherein in step c), there is calculated, as a wind characteristic, a speed vector $\overrightarrow{Vv}$ of said wind, using the following expression:

$$\overrightarrow{Vv} = \overrightarrow{Vgs} - \overrightarrow{Vair} + \overrightarrow{\Omega} \char`\^ \overrightarrow{GA}$$

wherein:
$\overrightarrow{Vgs}$ represents said first piece of speed information;
$\overrightarrow{Vair}$ represents said second piece of speed information;
$\char`\^$ represents the vector product;
$\overrightarrow{\Omega}$ represents the rotation rate of the aircraft (AC) in an inertial reference system;
G represents a reference point of the aircraft (AC), corresponding to said first point; and
A represents the position on the aircraft (AC) of at least one anemometric probe, the measurements thereof being used for determining said second piece of speed information, such a position A corresponding to said second point.

2. A method for automatically generating aboard an aircraft (AC) at least one wind characteristic existing outside said aircraft (AC),
wherein, upon said aircraft (AC) flying, the following automated operations are performed via a processor:
a) a first piece of speed information is determined on the aircraft (AC);
b) a second piece of speed information $\overrightarrow{Vair}$ is determined on the aircraft (AC); and
c) from at least said first and second speed information, said wind characteristic is determined in said terrestrial reference system, such a wind characteristic being determined taking into account a corrective term being representative of an apparent wind,
wherein said corrective term TC is calculated using the following expression:

$$TC = \overrightarrow{\Omega} \char`\^ \overrightarrow{GA}$$

where in step c), there is calculated, as a wind characteristic, a speed vector $\overrightarrow{Vv}$ of said wind, using the following expression:

$$\overrightarrow{Vv} = \overrightarrow{Vgs} - \overrightarrow{Vair} + \overrightarrow{\Omega} \char`\^ \overrightarrow{GA}$$

wherein:
$\overrightarrow{Vgs}$ represents said first piece of speed information;
$\overrightarrow{Vair}$ represents said second piece of speed information;
$\char`\^$ represents the vector product;
$\overrightarrow{\Omega}$ represents the rotation rate of the aircraft (AC) in an inertial reference system;
G represents a reference point of the aircraft (AC), corresponding to said first point; and
A represents the position on the aircraft (AC) of at least one anemometric probe, the measurements thereof being used for determining said second piece of speed information, such a position A corresponding to said second point.

3. A device for automatically estimating aboard an aircraft (AC) at least one wind characteristic existing outside said aircraft (AC), said device (1) being aboard the aircraft (AC) and comprising:

a first receiver configured to receive a first piece of speed information relating to the speed of the aircraft (AC) in a terrestrial reference system, being expressed in a first point (G) of the aircraft (AC);

a second receiver configured to receive a second piece of speed information ($\overrightarrow{Vair}$) relating to the speed of the aircraft (AC) in the air, being expressed in a second point (A) of the aircraft (AC);

an auxiliary processor configured to calculate a corrective term being representative of an apparent wind; and a wind characteristic processor configured to determine, at least from said first and second speed information, said wind characteristic in the terrestrial reference system, said wind characteristic processor being formed so as to determine said wind characteristic taking into account said corrective term, wherein said auxiliary processor comprises elements for calculating said corrective term TC using the following expression:

$$TC = \overrightarrow{\Omega} \wedge \overrightarrow{GA}$$

wherein said wind characteristic processor comprises elements for calculating, as a wind characteristic, a speed vector $\overrightarrow{Vv}$ of said wind, using the following expression:

$$\overrightarrow{Vv} = \overrightarrow{Vgs} - \overrightarrow{Vair} + \overrightarrow{\Omega} \wedge \overrightarrow{GA}$$

wherein:

$\overrightarrow{Vgs}$ represents said first piece of speed information;

$\overrightarrow{Vair}$ represents said second piece of speed information;

$\wedge$ represents the vector product;

$\overrightarrow{\Omega}$ represents the rotation rate of the aircraft (AC) in an inertial reference system;

G represents a reference point of the aircraft (AC), corresponding to said first point; and A represents the position on the aircraft (AC) of at least one anemometric probe, the measurements thereof being used for determining said second piece of speed information, such a position A corresponding to said second point.

4. A system for automatically generating aboard an aircraft (AC) at least one wind characteristic existing outside said aircraft (AC), wherein it is located aboard the aircraft (A) and comprises:

means (13) for generating a first piece of speed information;

means (11) for generating a second piece of speed information; and a device (1) according to claim 3, for estimating said wind characteristic based on said first and second speed information.

5. A system according to claim 4, it further comprising a display adapted to show to a crew member of the aircraft (AC) the wind characteristic having been estimated by said device (1).

6. An aircraft, comprising a device (1) according to claim 3.

7. An aircraft, comprising a system (10) according to claim 4.

8. A system for automatically generating aboard an aircraft (AC) at least one wind characteristic existing outside said aircraft (AC), wherein it is located aboard the aircraft (A) and comprises:

a first plurality of sensors adapted to generate a first piece of speed information;

a second plurality of sensors to generate a second piece of speed information; and a device (1) according to claim 3, for estimating said wind characteristic based on said first and second speed information.

9. The system of claim 8, wherein the first plurality of sensors comprises at least one anemometric sensor.

10. The system of claim 8, wherein the second plurality of sensors comprises at least on inertia sensor.

11. The system of claim 8, wherein the second plurality of sensors comprises a satellite positioning system.

* * * * *